(12) United States Patent
Shimoi et al.

(10) Patent No.: US 10,256,464 B2
(45) Date of Patent: Apr. 9, 2019

(54) METHOD FOR PRODUCING NEGATIVE ELECTRODE ACTIVE MATERIAL FOR LITHIUM ION SECONDARY BATTERY

(71) Applicants: TOHOKU UNIVERSITY, Miyagi (JP); DOWA HOLDINGS CO., LTD., Tokyo (JP)

(72) Inventors: Norihiro Shimoi, Miyagi (JP); Kazuyuki Tohji, Miyagi (JP); Yasumitsu Tanaka, Miyagi (JP); Qiwu Zhang, Miyagi (JP); Hiroyuki Kai, Tokyo (JP)

(73) Assignees: TOHOKU UNIVERSITY, Miyagi (JP); DOWA HOLDINGS CO., LTD., Tokyo (JP)

( * ) Notice: Subject to any disclaimer, the term of this patent is extended or adjusted under 35 U.S.C. 154(b) by 29 days.

(21) Appl. No.: 15/459,132

(22) Filed: Mar. 15, 2017

(65) Prior Publication Data

US 2017/0187034 A1    Jun. 29, 2017

Related U.S. Application Data

(60) Division of application No. 14/793,975, filed on Jul. 8, 2015, now Pat. No. 9,634,327, which is a
(Continued)

(30) Foreign Application Priority Data

Mar. 30, 2013  (JP) ................................ 2013-075474
Aug. 29, 2013  (JP) ................................ 2013-178679
Aug. 1, 2014   (JP) ................................ 2014-157999

(51) Int. Cl.
*H01M 4/82* (2006.01)
*H01M 4/38* (2006.01)
(Continued)

(52) U.S. Cl.
CPC ............. *H01M 4/386* (2013.01); *C01B 33/32* (2013.01); *C04B 35/58085* (2013.01);
(Continued)

(58) Field of Classification Search
CPC ........ H01M 4/48; H01M 4/485; H01M 4/364; H01M 4/362; H01M 4/04; H01M 4/043;
(Continued)

(56) References Cited

U.S. PATENT DOCUMENTS 6,057,469 A  *  5/2000  Margaria ................ C01B 33/02
                                                     252/182.32
8,580,462 B2 * 11/2013  Suenaga ................ B82Y 30/00
                                                           429/523
(Continued)

FOREIGN PATENT DOCUMENTS

JP      5-074463      3/1993
JP    2000-215887     8/2000
(Continued)

OTHER PUBLICATIONS

Garrido, vol. $74^{th}$, p. Rombunno. 16A-53-11, Aug. 31, 2013.
(Continued)

*Primary Examiner* — Raymond Alejandro
(74) *Attorney, Agent, or Firm* — Clark & Brody (57) ABSTRACT

A method for producing a negative electrode active material for a lithium ion secondary battery, comprising a step of charging either silicon and copper (II) oxide or silicon and copper metal in a pulverization device, pulverizing either the silicon and copper (II) oxide or silicon and copper metal, and simultaneously mixing either silicon and copper (II) oxide or silicon and copper metal thus pulverized. A negative electrode active material for a lithium ion secondary battery is produced by the method.

2 Claims, 7 Drawing Sheets

Related U.S. Application Data continuation-in-part of application No. PCT/JP2014/057967, filed on Mar. 24, 2014.

(51) Int. Cl.
| | | |
|---|---|---|
| *C04B 35/626* | (2006.01) | |
| *H01M 10/0525* | (2010.01) | |
| *H01M 4/485* | (2010.01) | |
| *H01M 4/36* | (2006.01) | |
| *C04B 35/58* | (2006.01) | |
| *C01B 33/32* | (2006.01) | |
| *H01M 4/02* | (2006.01) | |
| *H01M 10/052* | (2010.01) | |

(52) U.S. Cl.
CPC .......... *C04B 35/626* (2013.01); *H01M 4/364* (2013.01); *H01M 4/485* (2013.01); *H01M 10/0525* (2013.01); *C01P 2002/72* (2013.01); *C01P 2006/40* (2013.01); *C04B 2235/3281* (2013.01); *C04B 2235/407* (2013.01); *C04B 2235/428* (2013.01); *H01M 10/052* (2013.01); *H01M 2004/021* (2013.01); *H01M 2004/027* (2013.01); *Y02P 70/54* (2015.11)

(58) Field of Classification Search
CPC .... H01M 4/139; H01M 4/1395; H01M 4/386; H01M 10/052; H01M 10/0525; H01M 2004/021; H01M 2004/027; Y02E 60/122; C04B 35/58085; C04B 35/626; C01B 33/32; C01P 2002/72
See application file for complete search history.

(56) References Cited

U.S. PATENT DOCUMENTS

| | | | | |
|---|---|---|---|---|
| 9,166,380 | B2 * | 10/2015 | Baus | H01T 13/39 |
| 2005/0209475 | A1 * | 9/2005 | Inukai | C07F 7/16 |
| | | | | 556/472 |
| 2011/0117360 | A1 * | 5/2011 | Izumi | C04B 35/16 |
| | | | | 428/329 |
| 2014/0057176 | A1 * | 2/2014 | Park | H01M 4/366 |
| | | | | 429/220 |

FOREIGN PATENT DOCUMENTS

| | | | |
|---|---|---|---|
| JP | 2000-243396 | 9/2000 | |
| JP | 2004-335271 | 11/2004 | |
| JP | 2005-063767 | 3/2005 | |
| JP | 2010-244767 | 10/2010 | |
| JP | 2012-101301 | 5/2012 | |
| JP | 2012-113946 | 6/2012 | |
| JP | 2012-519360 | 8/2012 | |
| WO | 2012/139791 | 10/2012 | |
| WO | WO 2012/139791 | * 10/2012 | ............. C22C 19/00 |

OTHER PUBLICATIONS

Abstract of CN 102683639: Chen et al., "Anode material used in lithium-ion battery, comprises anode current collector and anode current collector of anode film containing anode active material, adhesive and conductive agent", Sep. 19, 2012.

* cited by examiner

[Fig.1]

(Example 2)

(Example 5)

METHOD FOR PRODUCING NEGATIVE ELECTRODE ACTIVE MATERIAL FOR LITHIUM ION SECONDARY BATTERY

CROSS-REFERENCE TO RELATED APPLICATIONS

This application is a divisional of U.S. application Ser. No. 14/793,975, filed on Jul. 8, 2015, now U.S. Pat. No. 9,634,327, which is a continuation-in-part of International Application No. PCT/JP2014/057967, filed on Mar. 24, 2014 with claiming priority of two Japanese patent Application No. 2013-075474 filed on Mar. 30, 2013 and No. 2013-178679 filed on Aug. 29, 2013 respectively, and also claims priority to Japanese patent Application No. 2014-157999 filed on Aug. 1, 2014. Each of these application is incorporated in their entirely by reference.

TECHNICAL FIELD

The present invention relates to a negative electrode active material for a secondary battery, such as a lithium ion secondary battery, and particularly relates to a negative electrode active material for a secondary battery, containing silicon, copper and oxygen as major constitutional elements, a method for producing the same, a negative electrode for a secondary battery using the negative electrode active material, and a secondary battery using the negative electrode.

BACKGROUND ART

In association with the remarkable progress of portable electronic devices, communication devices and the like in recent years, a lithium ion secondary battery having a high energy density is strongly demanded from the standpoint of the economy and the reduction in size and weight of the devices. As a measure for increasing the capacity of the lithium secondary battery of this type, various measures have been investigated including improvement of a positive electrode and a positive electrode active material, improvement of a negative electrode and a negative electrode active material, and the like. The improvement of a negative electrode and a negative electrode active material having been investigated includes the use of silicon (Si) or a silicon compound as a negative electrode active material. Silicon exhibits a theoretical capacity of 4,200 mAh/g, which is far higher than the theoretical capacity, 372 mAh/g, of a carbon material having been subjected to practical use, and thus is greatly expected for reduction in size and increase in capacity of the battery. Furthermore, silicon is capable of forming an alloy with lithium, and thus has excellent characteristics as a negative electrode material that it may not cause internal short-circuit due to the formation of dendrite on charge and discharge.

For example, JP-A-5-074463 describes a lithium secondary battery using single crystal silicon as a support of a negative electrode active material. For imparting conductivity to a negative electrode material, JP-A-2000-243396 describes a technique of mechanically alloying silicon oxide and graphite and then subjecting to a carbonization treatment, and JP-A-2000-215887 describes a technique of covering a surface of silicon particles with a carbon layer by a chemical vapor deposition method. In these ordinary techniques, the conductivity of the negative electrode material may be improved by providing a carbon layer on a surface of silicon particles, but the problematic low cycle characteristic of the silicon negative electrode active material due to the large volume change associated with charge and discharge have not yet been solved.

In the case where silicon is alloyed with lithium, the volume thereof is increased at most approximately 4 times. On repeated charge and discharge, accordingly, it is considered that a large internal strain occurs within the silicon particles and finely pulverizes the silicon particles to deteriorate the cycle characteristics. Various measures have been investigated for solving the problem of the low cycle characteristics of the silicon negative electrode active material. JP-A-2004-335271 describes a technique of providing a negative electrode active material by mechanically alloying silicon with a metal, such as titanium, nickel or copper, in a ball mill. JP-A-2010-244767 describes a technique of providing a negative electrode active material by treating silicon particles and copper particles with a dry attritor. JP-A-2012-113945 describes a technique of providing an aggregated material by pulverizing coarse powder of silicon with a bead mill and subsequently adding copper powder as conductive base powder thereto, followed by applying a shearing force thereto.

However, even by using these techniques, the improvement of the battery characteristics due to the negative electrode active material, such as the battery capacity per unit mass of the negative electrode active material, and the cycle characteristics, has not yet been sufficient, and it is the current situation that a secondary battery using a negative electrode active material using silicon is not used widely.

SUMMARY OF INVENTION

Technical Problem

A negative electrode active material using silicon or a silicon compound is largely expected in reduction in size and increase in capacity of the battery due to the large theoretical capacity thereof, but it is the current situation that the battery capacity per unit mass of the negative electrode active material and the cycle characteristics may not be enhanced simultaneously to certain levels or higher. An object to be achieved by the invention is to provide a negative electrode active material that has good cycle characteristics and has a large battery capacity that practically achieves a negative electrode active material for a lithium ion secondary battery, and a method for producing the same. Another object of the invention is to provide a negative electrode and a secondary battery using the negative electrode active material, and methods for producing the same.

Solution to Problem

As a result of earnest investigations made by the inventors, it has been found that a negative electrode active material for a secondary battery, containing silicon, copper and oxygen as major constitutional elements may be obtained in such a manner that silicon and copper (II) oxide are charged in a pulverization device and pulverized, and simultaneously the pulverized product is mixed, or in such a manner that silicon, metallic copper (i.e., copper(0)) and water are charged in a pulverization device and pulverized, and simultaneously the pulverized product is mixed, and the negative electrode active material for a secondary battery of the invention has good cycle characteristics and is such a negative electrode active material that has a large battery capacity that practically achieves a negative electrode active material for a lithium ion secondary battery, and thus the invention has been completed.

While the reason why the negative electrode active material of the invention has good cycle characteristics as compared to the negative electrode active materials described in JP-A-2004-335271, JP-A-2010-244767 and JP-A-2012-113945, which are obtained by applying a shearing force to silicon and metallic copper, is not currently determined, the inventors are considering as follows.

The negative electrode active material of the invention is obtained by charging silicon and copper oxide, or silicon, metallic copper and water in a pulverization device and subjecting them to pulverization and mixing simultaneously, and in the process of pulverization and mixing, it is considered that silicon partially reduces copper oxide, and silicon itself is partially oxidized in the case where silicon and copper oxide are used as raw materials. In the case where silicon, metallic copper and water are used as raw materials, it is considered that silicon is reacted with water and is partially oxidized. It is considered that the reaction product obtained by partially oxidizing silicon is present in the negative electrode active material, thereby improving the cycle characteristics.

For achieving the aforementioned objects, the invention provides the following. Specifically, there is provided a negative electrode active material for a lithium ion secondary battery, containing fine particles of silicon having an average crystallite diameter ($D_x$) of Si measured by an X-ray diffractometry of 50 nm or less, and preferably 30 nm or less, and more preferably 20 nm or less, and has elemental ratios Cu/(Si+Cu+O) and O/(Si+Cu+O) where the elemental ratios are shown by molar ratios of from 0.02 to 0.30, preferably from 0.04 to 0.20, and more preferably from 0.05 to 0.12.

The negative electrode active material for a lithium ion secondary battery may contain an amorphous silicon oxide as a constitutional substance thereof. In such a case, the peak area ratio of the negative electrode active material (SiOx/Si(0)) calculated from the X-ray photoelectron spectroscopy (XPS) measurement may be of from 0.06 to 0.72.

And, the negative electrode active material for a lithium ion secondary battery may contain an intermetallic compound of silicon and copper, such as $Cu_3Si$, as a constitutional substance thereof. In such a case, the peak intensity ratio ($Cu_3Si/Si$) calculated from the X-ray diffractometry (XRD) measurement may be of from 0.05 to 1.5.

The invention also provides the following as a method for producing a negative electrode active material for a lithium ion secondary battery. Specifically, in a first embodiment, there is provided a method for producing a negative electrode active material for a lithium ion secondary battery, containing a step of charging silicon and copper (II) oxide as raw materials for a negative electrode active material for a lithium ion secondary battery in a pulverization device, pulverizing silicon and copper (II) oxide, and simultaneously mixing silicon and copper (II) oxide thus pulverized.

In a second embodiment, there is provided a method for producing a negative electrode active material for a lithium ion secondary battery, containing a step of charging silicon, metallic copper and water as raw materials for a negative electrode active material for a lithium ion secondary battery in a pulverization device, pulverizing silicon and metallic copper, and simultaneously mixing silicon and metallic copper thus pulverized.

The negative electrode active material for a lithium ion secondary battery of the invention encompasses all the negative electrode active materials that are produced by the production methods according to the first and second embodiments.

A negative electrode for a lithium ion secondary battery may be produced by using the negative electrode active material obtained by the invention, and a lithium ion secondary battery may be produced by using the negative electrode for a lithium ion secondary battery.

Advantageous Effects of Invention

In the invention, silicon and copper (II) oxide, or silicon, metallic copper and water are pulverized, and simultaneously the pulverized product is mixed, thereby providing a negative electrode active material for a lithium ion secondary battery containing silicon, copper and oxygen as major constitutional elements. The negative electrode active material for a secondary battery has good cycle characteristics and has a large battery capacity that practically achieves a negative electrode active material for a lithium ion secondary battery. Furthermore, a negative electrode for a lithium secondary battery and a lithium ion secondary battery using the negative electrode active material may be provided.

BRIEF DESCRIPTION OF DRAWINGS

FIG. 3(*a*) shows the XRD measurement results of the negative electrode active materials of Examples 1 to 4.

FIG. 3(*b*) shows the XRD measurement results of the negative electrode active materials of Examples 5 to 8.

FIG. 3(*c*) shows the XRD measurement results of the negative electrode active materials of Examples 9 to 12.

FIG. 5(*a*) is the transmission electron micrograph of the negative electrode active material of Example 1.

FIG. 5(*b*) is the transmission electron micrograph of the negative electrode active material of Example 1.

DESCRIPTION OF EMBODIMENTS

Negative Electrode Active Material

The negative electrode active material for a lithium ion secondary battery of the invention is obtained by pulverizing silicon and copper (II) oxide, or silicon, metallic copper and water, as raw materials in a known pulverizing device, and simultaneously mixing the pulverized raw materials. The timing of charging the raw materials depends on the size of the raw materials used, and the raw materials may not be necessarily charged simultaneously. However, in view of the surface oxidation reaction of silicon described later, it is necessary to ensure a period of time where silicon and copper (II) oxide, or silicon and metallic copper are simultaneously pulverized and mixed, and the raw materials are preferably charged simultaneously.

In an X-ray diffractometry (XRD) pattern of a specimen of silicon and copper (II) oxide before pulverizing and mixing, a peak corresponding to copper (II) oxide is observed, but in an XRD pattern of the negative electrode active materials obtained in Examples, a peak corresponding to copper (II) oxide is not observed. It is considered that this is because copper (II) oxide is reduced with silicon and loses the whole or a part of oxygen in the pulverizing and mixing treatment in the pulverization device. In the XRD patterns of the negative electrode active materials obtained in Examples, a peak is observed around 2θ of 44.8°, which shows the presence of $Cu_3Si$. The half value width of the peak corresponding to silicon is increased through the pulverization treatment, from which it is understood that fine crystallization of silicon occurs.

In the case where silicon, metallic copper and water are pulverized and mixed, the increase of the half value width of the peak corresponding to silicon is observed, and thus it is apparent that fine crystallization of silicon occurs in this case.

Figure 1:
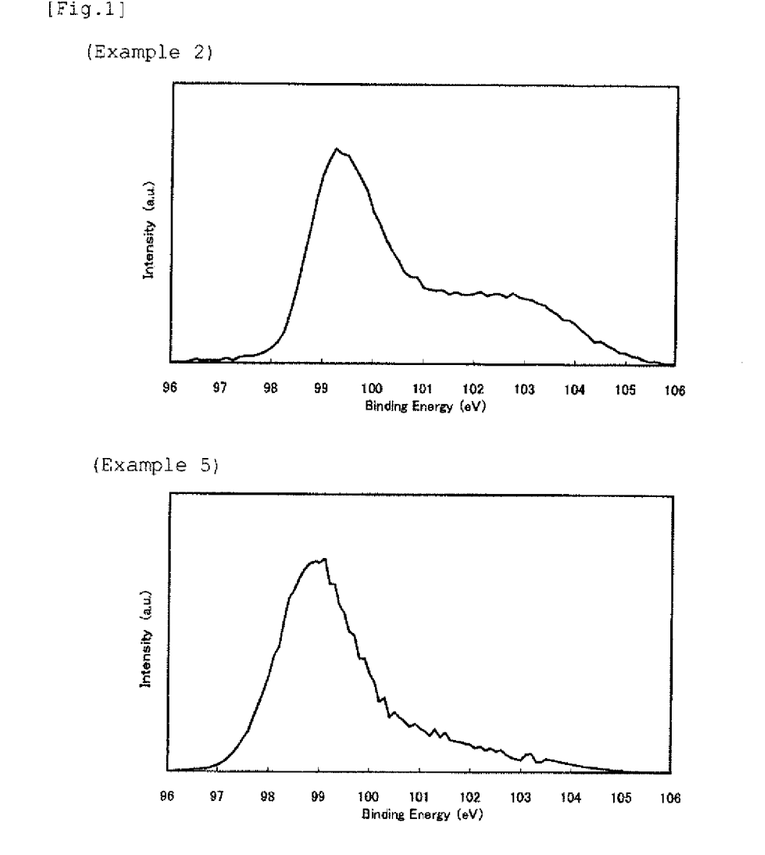
FIG. 1 shows the XPS measurement results of the negative electrode active materials of Examples 2 and 5.

FIG. 1 shows the spectra of the 2p peak of silicon obtained by the X-ray photoelectron spectroscopy (XPS) for the negative electrode active materials obtained in Examples 2 and 5 described later. In the Si 2p spectrum, peaks corresponding to plural kinds of oxides with different oxidation states are observed in addition to a peak corresponding to silicon in a metallic state (Si(0)), from which it is understood that oxides of silicon including lower oxides, i.e., $SiO_x$ (wherein 0<x<2), are present therein. Accordingly, it is considered that when silicon and copper (II) oxide are pulverized and mixed, silicon functions as a reducing agent and removes the whole or a part from oxygen of copper (II) oxide, and the silicon itself is oxidized. In FIG. 1, the measurement is performed at a photoelectron takeoff angle of 45° after performing sputter etching of the specimen surface under the condition that the silicon substrate is etched to a depth of 100 nm. The similar Si 2p spectrum is also obtained in the case where silicon, metallic copper and water are charged and subjected to pulverization and mixing, and it may be understood in this case that silicon and water are reacted.

The mechanism of the improvement in cycle characteristics of the electrode active material obtained by the pulverization and mixing treatment in the invention is currently unclear, but for example, the following mechanism may be estimated from the measurement results.

The composite material of the negative electrode active material obtained by practicing the invention contains a copper-silicon compound, such as $Cu_3Si$, formed as a result of reaction of silicon and copper in the raw materials through the pulverization treatment, in addition to the silicon that is finely crystallized through the pulverization treatment. In addition, furthermore, a silicon oxide formed as a result of reaction of oxygen of copper oxide or water with silicon is also present in a certain amount or more. It is understood from Comparative Example 2 described later that a negative electrode active material that is obtained by pulverizing silicon and metallic copper as the ordinary technique contains a copper-silicon compound, such as $Cu_3Si$, formed as a result of reaction of silicon and copper in the raw materials through the pulverization treatment, in addition to the silicon that is finely crystallized. It is understood therefrom that copper element and oxygen element are contained in certain amounts or more in addition to silicon having been finely crystallized, thereby relaxing the stress due to volume expansion and contraction of silicon caused by absorption and release of lithium ion, but the detailed mechanism thereof is currently unclear. The amount of $Cu_3Si$ contained in the negative electrode active material for a lithium secondary battery obtained in the invention is preferably from 0.05 to 1.5, in term of the peak intensity ratio ($Cu_3Si$/Si) calculated from the X-ray diffractometry (XRD) measurement described later. The case where the peak intensity ratio is less than 0.05 is not preferred since the cycle characteristics may not be sufficiently improved in some cases. The case where the peak intensity ratio exceeds 1.5 is not preferred since the proportion of crystalline Si is less in the negative electrode active material, so that the initial discharge capacity may not sufficiently obtained in some cases. It is considered that the composite material of the electrode active material of the invention contains a slight amount of fine particles of copper (II) oxide that has not been reduced through the treatment, but the presence thereof may not cause any particular problem.

When silicon crystals are made fine, the absolute value of volume fluctuation of the silicon fine crystals is decreased, and from the standpoint of preventing the deterioration in battery characteristics due to the volume fluctuation of the silicon fine crystals caused by absorption and release of lithium ion, it is considered that the silicon fine crystals are preferably made further fine.

The average particle diameter of the silicon fine crystals contained in the negative electrode active material for a lithium secondary battery obtained in the invention is preferably 50 nm or less, and more preferably 30 nm or less, and more preferably 20 nm or less, in terms of an average crystallite diameter ($D_x$) measured by an X-ray diffractometry (XRD) described later. The case where the crystallite diameter exceeds 50 nm is not preferred since the cycle characteristics may not be sufficiently improved in some cases. The lower limit of $D_x$ may not be particularly determined and may be practically 1 nm or more since it is difficult to decrease to less than 1 nm by the pulverization treatment.

The negative electrode active material for a lithium ion battery of the invention contains silicon, copper and oxygen as major constitutional elements, and the elemental ratios Cu/(Si+Cu+O) and O/(Si+Cu+O) where the elemental ratios are shown by molar ratios each are preferably from 0.02 to 0.30. The elemental ratios are more preferably from 0.04 to 0.20, and further preferably from 0.05 to 0.12. The case where the elemental ratios are less than 0.02 is not preferred since the cycle characteristics may not be sufficiently improved in some cases, and the case where the elemental ratios exceed 0.30 is not preferred since the battery capacity per unit mass of the active material may be small in some cases. From the standpoint of enhancing the cycle characteristics and the capacity per unit mass of the active material simultaneously, the elemental ratios each are preferably from 0.04 to 0.20, and further preferably from 0.05 to 0.12. These values may be controlled by changing the mixing ratios of the raw materials.

Even it the case where the negative electrode active material of the invention, which is obtained by pulverizing simultaneously silicon and copper (II) oxide, or silicon, copper and water with a pulverization device, such as a ball mill and a bead mill, contains substances containing other constitutional elements than silicon, copper and oxygen, the advantageous effects of the invention may be exhibited when the mixed amounts thereof are certain values or less. The negative electrode active material for a lithium ion secondary battery containing silicon, copper and oxygen as major constitutional elements means that the total content of silicon, copper and oxygen in the negative electrode active material is 70% by mass or more, and the total content is preferably 80% by mass or more, and more preferably 90% by mass or more.

Starting Materials
Silicon

Silicon as a starting material used for producing the negative electrode substance for a lithium ion secondary battery of the invention is not particularly limited in the form thereof, as far as the material is formed of silicon. Examples thereof used include pure silicon, such as a commercially available silicon substrate (including a single crystal substrate and a polycrystalline substrate), polycrystalline silicon for raw material and amorphous silicon, and also include silicon alloys. The method for producing a negative electrode active material of the invention contains a pulverization step with a pulverization device, and thus the size of silicon as the starting material is not particularly limited and is preferably 1 mm or less from the standpoint of workability.

Copper (II) Oxide

Silicon and copper (II) oxide are pulverized and simultaneously mixed in the pulverization device, thereby providing the negative electrode active material of the invention. While the reason why the cycle characteristics and the battery capacity are enhanced by the pulverization treatment is currently unclear, it is considered that this is because through the pulverization treatment, silicon as the raw material is made fine, and a reaction product is formed as a result of partial reaction of oxygen in copper oxide with silicon as the raw material and is present in the negative electrode active material. Any material may be used as copper (II) oxide used as the starting material, for example, commercially available copper (II) oxide powder.

Metallic Copper and Water

Silicon, metallic copper and water are pulverized and simultaneously mixed in the pulverization device, thereby providing the negative electrode active material of the invention. While the reason why the cycle characteristics and the battery capacity are enhanced by the pulverization treatment is currently unclear, it is considered that this is because through the pulverization treatment, silicon as the raw material is made fine, and a reaction product is formed as a result of partial reaction of oxygen in water with silicon as the raw material in the presence of copper and is present in the negative electrode active material. Metallic copper used as the starting material may be commercially available metallic copper powder or the like. In the case where silicon, metallic copper and water are used as raw materials, it may be considered that the surface of metallic copper may be reacted with water through the pulverization to form partially copper hydroxide and copper oxide, and metallic copper herein includes these substances.

The purity of water is not particularly limited, and high purity water, such as ion exchanged water, reverse osmosis water and distilled water, is preferably used from the standpoint of decrease of impurities. When the amount of water that is charged to the pulverization device is excessive, the elemental ratio O/(Si+Cu+O) of the resulting negative electrode active material obtained through the pulverization treatment may be too large in some cases. Specifically, the mass ratio of water with respect to silicon ($H_2O/Si$) is preferably 0.5 or less, and more preferably 0.2 or less.

Pulverization Device

In the method for producing a negative electrode active material for a lithium ion secondary battery of the invention, a pulverization device is used for pulverizing and simultaneously mixing silicon and copper (TI) oxide, or silicon, copper and water. Any of ordinary pulverization devices, such as a vibration mill and a ball mill, may be used as the pulverization device. In the case where the raw materials used have sizes that are largely different from each other, such a method may be used that the raw material having a large size is firstly pulverized, and then the balance of the raw materials are charged, and pulverized and simultaneously mixed. The pulverization medium is also not particularly limited, and zirconia balls or the like may be used. Silicon and copper (TI) oxide, or silicon, copper and water as the starting materials are weighed and charged in the pulverization device, and the starting materials are pulverized under agitation, thereby providing the negative electrode active material of the invention. The starting materials may be pulverized with an agitation solvent charged in the pulverization device along with the pulverization medium. The agitation solvent used may be a non-polar organic solvent. The vessel of the pulverization device, in which silicon and copper (II) oxide, or silicon, copper and water are charged, may have a structure capable of being sealed, for enhancing the controllability of the elemental ratio (O/(Si+Cu+O)) of the resulting negative electrode active material.

In the pulverization treatment, the suitable ranges of the conditions for the pulverization treatment including the rotation number, the vibration number and the treating time, vary depending on the conditions including the charged amount of the raw material, the specification of the device and the pulverization medium, and thus may be determined appropriately. In the case where the pulverization treatment is performed with the pulverization medium, the pulverization medium may be removed with a sieve or the like after completing the pulverization, thereby providing the negative electrode active material of the invention.

Negative Electrode for Lithium Ion Secondary Battery

A negative electrode for a lithium ion secondary battery may be produced by using the negative electrode active material of the invention according to a known method. For example, a suitable binder is mixed with the negative electrode active material, with which suitable conductive powder is mixed for enhancing the conductivity depending on necessity. A solvent capable of dissolving the binder is added to the resulting mixture, and the mixture is sufficiently agitated depending on necessity with a known agitator to form a slurry. The slurry containing the negative electrode active material is coated on an electrode substrate (collector), such as a rolled copper foil, with a doctor blade or the like, followed by drying, and then densified by rolling or the like depending on necessity, thereby producing a negative electrode for a non-aqueous electrolyte secondary battery.

Lithium Ion Secondary Battery

A lithium ion secondary battery may be fabricated by using the negative electrode thus produced above, and other non-aqueous electrolyte secondary batteries may also be produced. A lithium ion secondary battery contains as a basic structure a negative electrode, a positive electrode, a separator and a non-aqueous electrolyte, and the lithium ion secondary battery may be fabricated by using the negative electrode thus produced according to the aforementioned manner, a known positive electrode, a known separator and a known electrolyte.

Production Method of Battery for Evaluation

The performance evaluation of the negative electrode active material for a lithium ion secondary battery obtained in the invention was performed in the following manner.

0.29 part by mass of artificial graphite (average particle diameter. D50: 4 μm) was added to 1.0 part by mass of the resulting powder (negative electrode active material) to form a mixture. 3.12 parts by mass of a polyimide resin (U-Varnish A, a trade name, produced by Ube Industries, Ltd.: solid content: 18% by mass) and 0.86 part by mass of N-methylpyrrolidone were added thereto, followed by agitating, to provide a slurry. The slurry was coated on a copper foil (negative electrode collector) having a thickness of 10 μm with a doctor blade of 50 μm, dried in a nitrogen atmosphere at 70° C. for 20 minutes, and then baked in vacuum at 650° C. for 3 hours. After baking, the assembly was pressurized at 19.6 MPa (200 kgf/cm$^2$) and punched into 1.5 cm$^2$, thereby providing a negative electrode molded article.

A battery for evaluation was produced in the following manner. LiCoO$_2$ was used as an active material of a positive electrode, and a single layer sheet using an aluminum foil (produced by Hohsen Corporation) was used as a positive electrode collector. A non-aqueous electrolyte solution obtained by dissolving lithium hexafluorophosphate in a mixed solution of ethylene carbonate, diethyl carbonate and dimethyl carbonate (60/25/15 by volume) to a concentration of 1 mol/L was used as the non-aqueous electrolyte solution, with which a coin type lithium ion secondary battery was produced by using a polyethylene fine porous film having a thickness of 50 μm as a separator. The battery for evaluation thus obtained was used for evaluating the initial charge and discharge efficiency and the cycle characteristics of the negative electrode molded article.

Evaluation Method for Battery Capacity and Cycle Characteristics

The lithium ion secondary battery for evaluation thus produced was allowed to stand at room temperature for 3 hours and then charged by using a charge and discharge equipment (produced by Hokuto Denko Corporation) in such a manner that the battery was charged at a constant current of 0.3 mA until the voltage of the test cell reached 0.02 V, and after reaching 0.02 V, the battery was charged with a current that was decreased to maintain a constant cell voltage of 0.02 V. The charge was completed at the time when the current became less than 10 μA. The discharge was performed at a constant current of 0.3 mA, the discharge was completed at the time when the cell voltage became more than 3.8 V, and then the discharge capacity was obtained.

The lithium ion secondary battery for evaluation was subjected to a 50-cycle charge and discharge test by repeating the aforementioned charge and discharge test 50 times. The evaluation results of Examples and Comparative Examples shown later are shown in Table 1. In Table 1, the discharge capacity after one cycle is designated as the initial discharge capacity, and the ratio of the discharge capacity after 50 cycles with respect to the initial discharge capacity is designated as the capacity maintenance ratio after 50 cycles (%) The charge and discharge capacity herein means the capacity per unit mass of the negative electrode active material. In Example 1 and Comparative Example 1, the charge and discharge test of 100 cycles was also performed, and the results thereof are shown in Table 1.

Measurement Method of Elemental Ratio of Negative Electrode Active Material

The elemental ratio of the resulting negative electrode active material was measured in the following manner by using a scanning electron microscope (Hitachi SU-8000) and an energy dispersive X-ray microanalysis system for electron microscope (NORAD System 7, NSS312E, produced by Thermo Fisher Scientific, Inc.).

The specimen was measured at 10 points respectively for the elemental ratio of Si, Cu and O in a measurement field of 200 μm×200 μm at an acceleration voltage of 10 kV, and the elemental ratios (Si/(Si+Cu+O), (O/(Si+Cu+O) and Cu/(Si+Cu+O)) were calculated from the average value of the 10 measured values.

The local elemental ratio was measured in the following manner.

A specimen having a thickness of 100 nm was formed for the resulting negative electrode active material by using a focused ion beam apparatus (FIB apparatus). The specimen was measured for the local elemental ratio by using STEM-EDX (Model HD-2700, produced by Hitachi, Ltd.) under measurement conditions of an acceleration voltage of 200 kV.

X-ray Diffractometry Evaluation Method of Negative Electrode Active Material

The resulting negative electrode active material was measured with an X-ray diffractometry apparatus (MINT-2000, produced by Rigaku Corporation) under conditions of a Cu radiation source (40 kV/20 mA) for evaluating X-ray diffractometry (XRD), thereby providing an X-ray diffraction pattern.

In the case where the average crystallite diameter ($D_x$) of Si is calculated from the measurement results of XRD, the crystallite diameter ($D_x$) is calculated by substituting the half value width β of the (111) plane of the Si phase obtained from the X-ray diffraction pattern into the Scherrer equation, $D=(K\cdot\lambda)/(\beta\cdot\cos\theta)$. In the Scherrer equation, D represents the crystallite diameter (nm), λ represents the wavelength of the X-ray used for measurement (nm), β represents the diffraction width due to the crystallite (half value width, radian), θ represents the Bragg angle of the diffraction angle, and K represents the Scherrer constant, and in the equation, the wavelength λ of the X-ray used for measurement was 0.154 nm, and the Scherrer constant K was 0.9.

From the measurement results of XRD, the peak intensity ratio (Cu$_3$Si/Si) is calculated in the following manner, wherein numerator is the peak height corresponding to Cu$_3$Si and denominator is the peak height corresponding to Si. First, the peak separation is conducted in order to separate the diffraction peak corresponding to Cu$_3$Si, 2θ of which peak center is in the vicinity of 44.8°, and the diffraction peak corresponding to Si, 2θ of which peak center is in the vicinity of 47.4°. Then, the peak intensity ratio (Cu$_3$Si/Si) is calculated from the height of the peak corresponding to Cu$_3$Si obtained by the peak separation, 2θ of which peak center is in the vicinity of 44.8°, and the height of the peak corresponding to Si, 2θ of which peak center is in the vicinity of 28.4°, X-ray Photoelectron Spectroscopy Evaluation Method of Negative Electrode Active Material In the X-ray photoelectron spectroscopy evaluation of the negative electrode active material, the measurement was performed with an AlKα line having been made monochromatic with a monochromater as the X-ray radiation source under conditions of a measurement field of 0.62 mm in diameter and a photoelectron takeoff angle of 45°. Before the measurement, the surface of the specimen was subjected to Ar sputter etching under conditions where the silicon substrate was etched to a depth of 100 nm. In Si2p spectra, in addition to the peak corresponding to the metallic state of silicon (Si (0)), a plurality of peaks shifted to the high binding energy side than the peak of Si (0) was observed. These peaks shifted to the high binding energy side are considered to be the peaks corresponding to the plural oxides having different oxidation states (oxides of silicon comprising a lower oxide, that SiOx (although 0<x<2)). After the peak separation of the peaks corresponding to Si (0) and SiOx, the peak area ratios, (SiOx/Si (0), is calculated, wherein SiOx is the sum of the areas of the peaks corresponding to SiOx, and Si (0) is the area of the peak corresponding to Si (0).

EXAMPLE

Example 1

Figure 2:
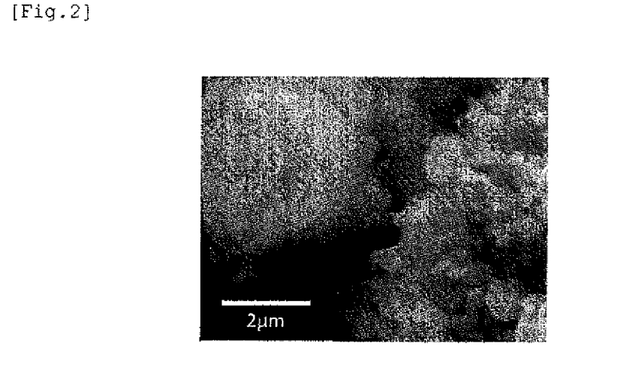
FIG. 2 is the scanning electron micrograph of the negative electrode active material obtained by pulverizing and simultaneously mixing silicon and copper (II) oxide.
Figure 3A:
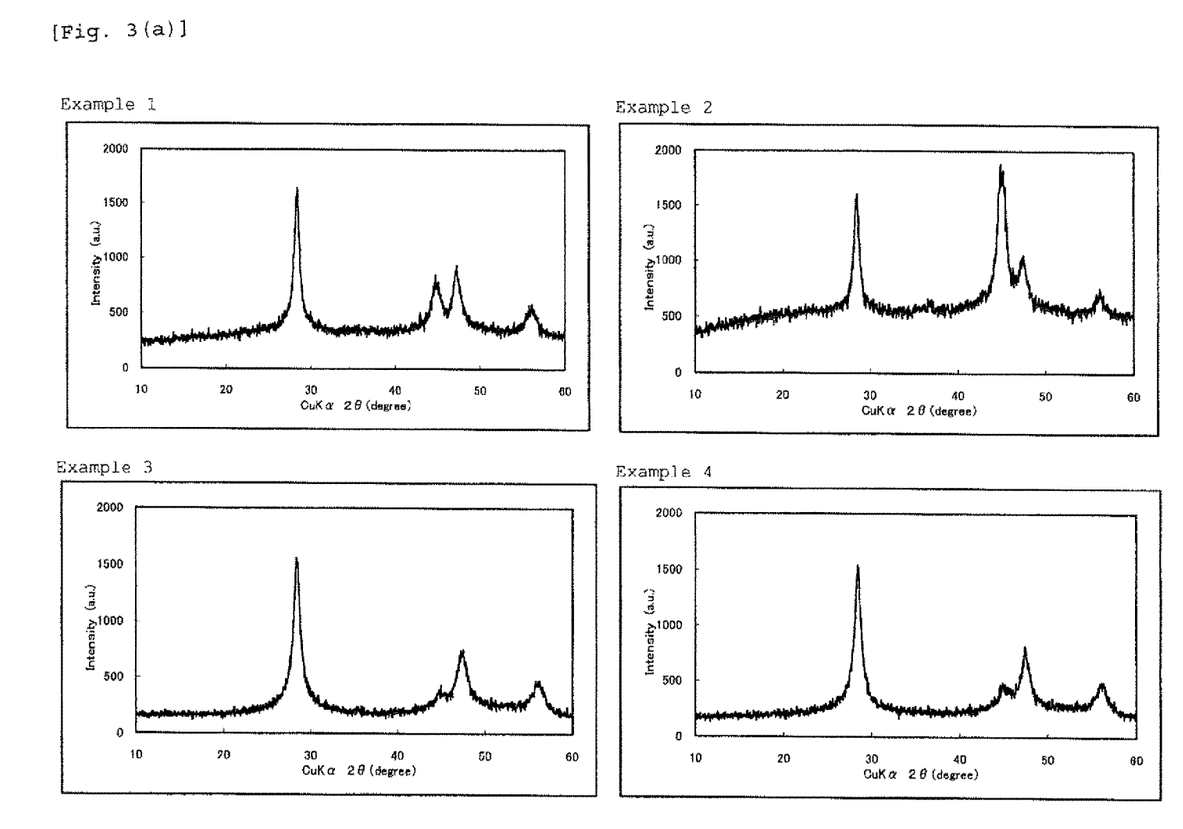
Figure 3B:
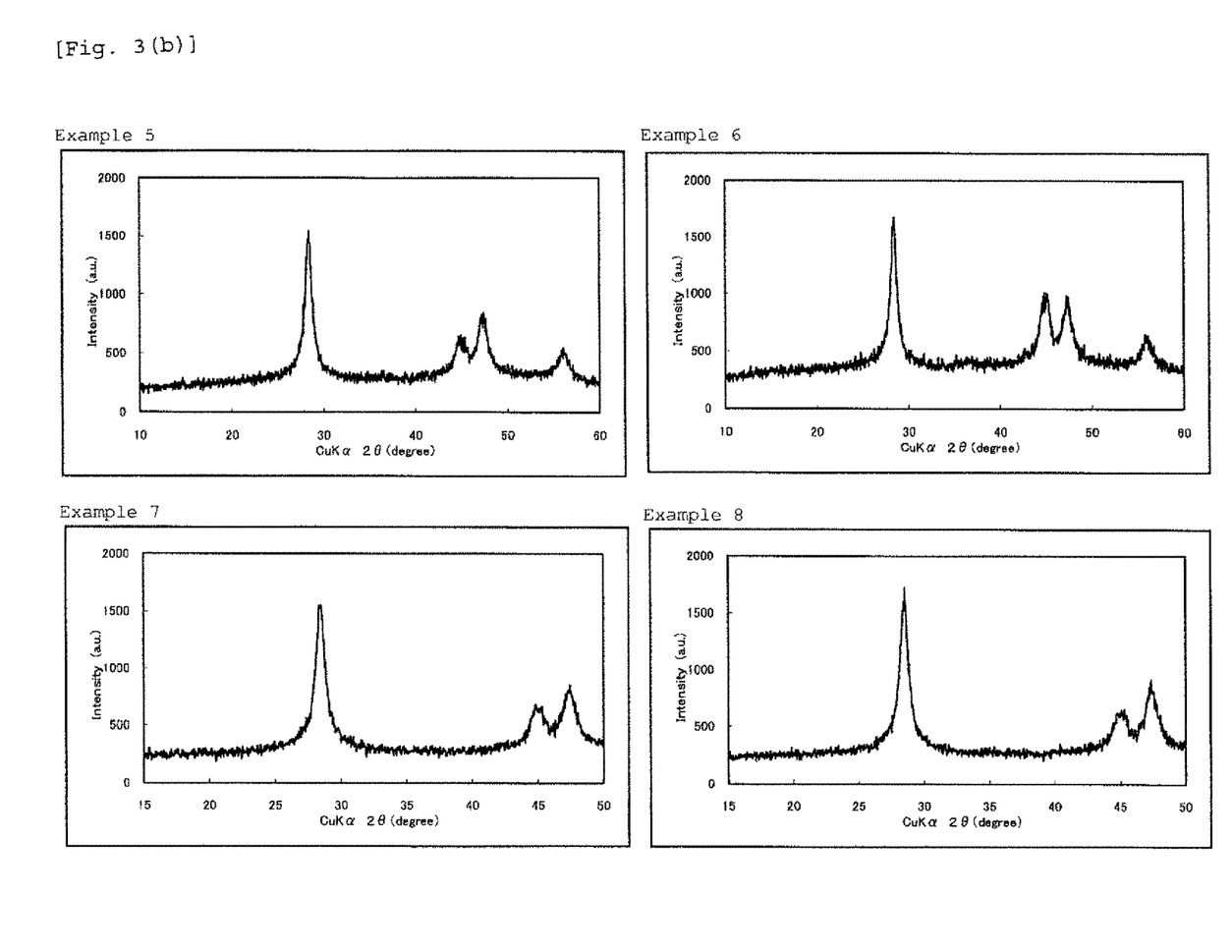
Figure 3C:
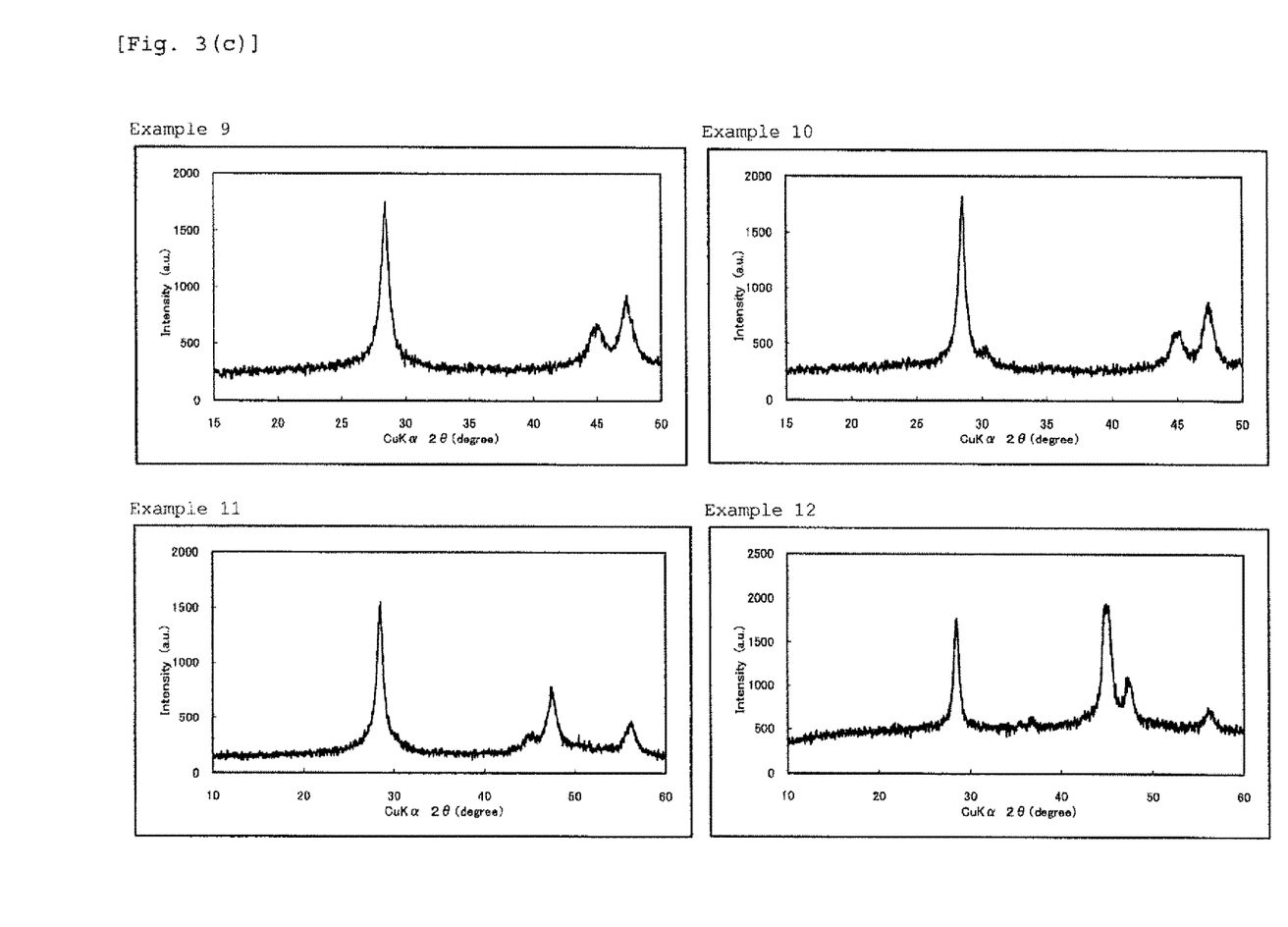
Figure 3D:
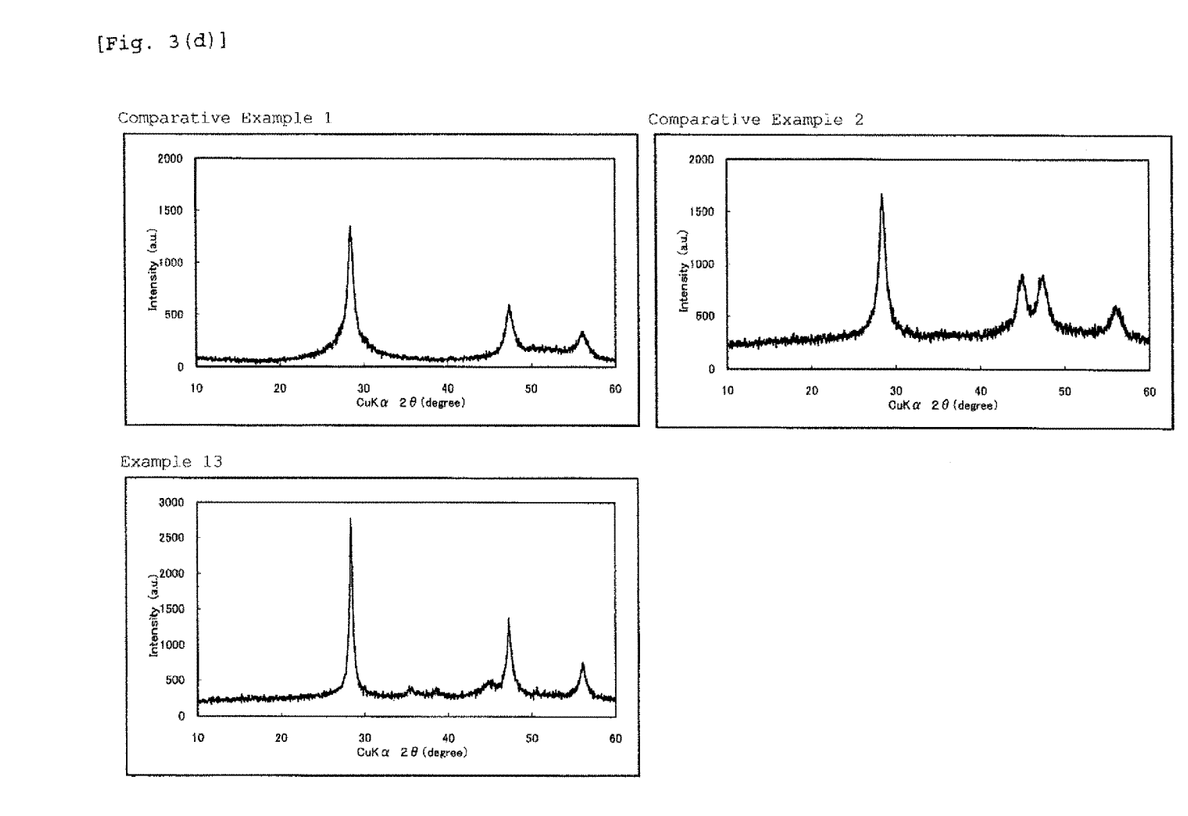
FIG. 3*d*) shows the XRD measurement results of the negative electrode active materials of Comparative Examples 1, 2 and Example 13.

1.56 g of Si particles having an average particle diameter of 5 μm (produced by Kojundo Chemical Lab. Co., Ltd., purity: 99.9%), 0.44 g of CuO powder (produced by Rare Metallic Co., Ltd., purity: 99.9% by mass, average particle diameter of 1 μm) and 7 pieces of zirconia balls having a diameter of 15 mm were placed in a pulverizing pot (formed of stainless steel, capacity: 45 cm$^3$), which was then sealed. The pulverizing pot was mounted on a planetary ball mill (Pulverisette-7, produced by Fritsch GmbH), and the pulverization treatment was performed under conditions of a rotation speed of 600 rpm for 3 hours. The zirconia balls were separated from the content of the pulverizing pot to provide a negative electrode active material. The elemental ratio, the half value width of the Si (111) peak in XRD, the crystallite diameter, and the peak intensity ratio (Cu$_3$Si/Si) of the resulting negative electrode active material are shown in Table 1, and the scanning electron micrograph thereof is shown in FIG. 2. In the XRD patterns of the negative electrode active materials obtained in Examples 1 to 13 (FIG. 3), a peak was observed around 2θ of 44.8°, which showed the presence of Cu$_3$Si.

Figure 4:
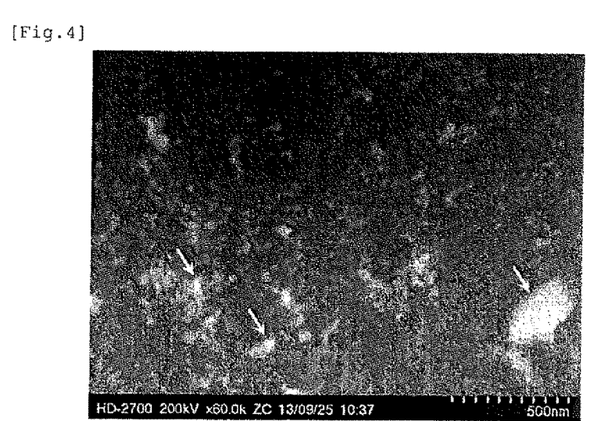
FIG. 4 is the transmission electron micrograph of the negative electrode active material of Example 1.

FIG. 4 shows the dark field image of a scanning transmission electron micrograph (STEM) of the negative electrode active material. The three regions (shown with an arrow) seen whitish in the STEM dark field image were measured for elemental ratio with STEM-EDX, and as a result, the Cu/Si molar ratio was from 2.73 to 3.27, which confirmed the formation of Cu$_3$Si.

Figure 5A:
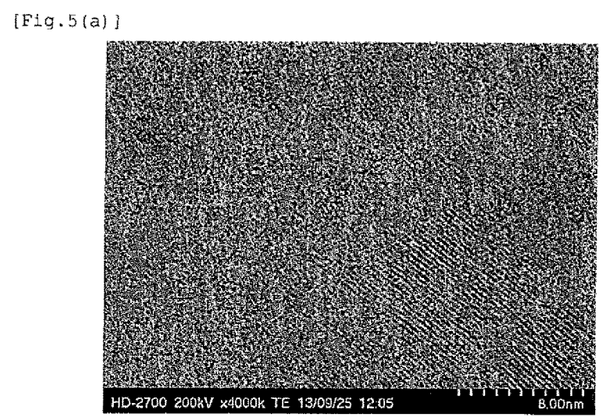
Figure 5B:
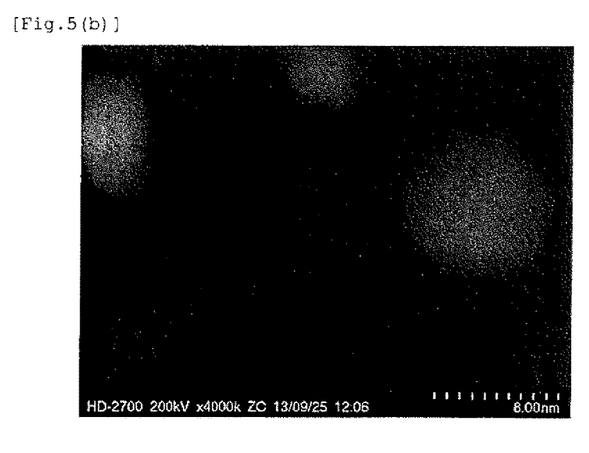

FIGS. 5(a) and 5(b) show the STEM images of the negative electrode active material obtained in Example 1. FIG. 5(a) shows the bright field STEM image, and FIG. 5(b) shows the dark field STEM image. The dark field STEM image shows that Cu$_3$Si is not formed in the lower half of the micrograph. Si in metallic state shows good crystallinity, but an amorphous region with crystal lattice turbulence are present therearound, and it is considered that the region is an amorphous Si oxide. In the bright field STEM image, it is considered that crystalline Si is present in the lower right region, and the amorphous Si oxide is present in the lower left region.

A battery for evaluation was produced by using the resulting negative electrode active material according to the aforementioned manner, and the negative electrode active material was evaluated for performance. The results of the charge and discharge test are shown in Table 1. The results of Examples 2 to 13 and Comparative Examples 1 and 2 are also shown in Table 1.

TABLE 1

| | Amount of raw material of negative electrode active material (g) | | | | Elemental ratio of active material (% by mass) | | | Elemental ratio of active material (% by mol) | | | Discharge capacity (mAh/g) | | | Maintenance ratio After 50 cycles (%) | Half value width (°) | Dx (Si) nm | Peak intensity ratio Cu$_3$Si/Si |
|---|---|---|---|---|---|---|---|---|---|---|---|---|---|---|---|---|---|
| | Si | CuO | Cu | H$_2$O | Si | O | Cu | Si/(Si + Cu + O) | O/(Si + Cu + O) | Cu/(Si + Cu + O) | Initial | After 50 cycles | After 100 cycles | | | | |
| Example 1 | 1.56 | 0.44 | 0 | 0 | 78.2 | 4.3 | 17.5 | 83.7 | 8.1 | 8.3 | 1296 | 1324 | 1165 | 102.2% | 0.68 | 12.0 | 0.345 |
| Example 2 | 1.077 | 0.923 | 0 | 0 | 51.6 | 9.1 | 39.3 | 60.7 | 18.8 | 20.4 | 939 | 714 | — | 76.0% | 0.68 | 12.0 | 1.356 |
| Example 3 | 1.824 | 0.176 | 0 | 0 | 90.7 | 1.8 | 7.5 | 93.3 | 3.3 | 3.4 | 494 | 431 | — | 87.2% | 0.76 | 10.8 | 0.094 |
| Example 4 | 1.75 | 0.25 | 0 | 0 | 87.7 | 2.4 | 9.9 | 91.1 | 4.4 | 4.6 | 956 | 635 | — | 66.4% | 0.76 | 10.8 | 0.161 |
| Example 5 | 1.65 | 0.35 | 0 | 0 | 81.3 | 3.7 | 15.0 | 86.1 | 6.9 | 7.0 | 1312 | 1189 | — | 90.6% | 0.72 | 11.4 | 0.228 |
| Example 6 | 1.477 | 0.523 | 0 | 0 | 72.3 | 5.5 | 22.2 | 78.8 | 10.5 | 10.7 | 1068 | 841 | — | 78.7% | 0.76 | 10.8 | 0.434 |
| Example 7 | 1.71 | 0 | 0.29 | 0.054 | 82.8 | 2.4 | 14.8 | 88.5 | 4.5 | 7.0 | 956 | 562 | — | 58.8% | 0.72 | 11.4 | 0.278 |
| Example 8 | 1.71 | 0 | 0.29 | 0.082 | 82.3 | 3.8 | 13.9 | 86.6 | 7.0 | 6.5 | 1312 | 997 | — | 76.0% | 0.68 | 12.0 | 0.190 |
| Example 9 | 1.71 | 0 | 0.29 | 0.11 | 81.6 | 4.7 | 13.7 | 85.1 | 8.6 | 6.3 | 1324 | 1162 | — | 87.8% | 0.68 | 12.0 | 0.218 |
| Example 10 | 1.71 | 0 | 0.29 | 0.371 | 71.9 | 14.9 | 13.2 | 69.2 | 25.2 | 5.6 | 1068 | 875 | — | 81.9% | 0.60 | 13.7 | 0.192 |
| Example 11 | 1.71 | 0 | 0.129 | 0.082 | 88.9 | 4.0 | 7.1 | 89.7 | 7.1 | 3.2 | 971 | 756 | — | 77.9% | 0.68 | 12.0 | 0.079 |
| Example 12 | 1.71 | 0 | 1.16 | 0.082 | 56.3 | 2.6 | 411 | 71.2 | 5.8 | 23.0 | 652 | 495 | — | 75.9% | 0.64 | 12.8 | 1.093 |
| Example 13 | 1.56 | 0.44 | 0 | 0 | 78.2 | 4.3 | 17.5 | 83.7 | 8.1 | 8.3 | 1073 | 810 | — | 75.6% | 0.44 | 18.6 | 0.057 |
| Comparative Example 1 | 2 | 0 | 0 | 0 | 99.8 | 0.2 | 0.0 | 99.6 | 0.4 | 0.0 | 1756 | 362 | 132 | 20.6% | 0.68 | 12.0 | — |
| Comparative Example 2 | 1.628 | 0 | 0.372 | 0 | 79.6 | 0.3 | 20.1 | 89.4 | 0.6 | 10.0 | 404 | 228 | — | 56.4% | 0.80 | 10.2 | 0.370 |

Example 2

A negative electrode active material and a battery using the same were produced and evaluated in the same manner as in Example 1 except that in the production of the negative electrode active material, the amount of Si particles was changed from 1.56 g to 1.077 g, and the amount of the CuO powder was changed from 0.44 g to 0.932 g.

The resulting negative electrode active material was analyzed by XPS. The resulting Si 2p peak is shown in FIG. 1. The Si 2p peak was able to be separated into five peaks corresponding to the oxidation numbers of from 0 to 4. This means that the resulting negative electrode active material contains Si oxides having different oxidation numbers present therein. The peak area ratio (SiOx/Si (0)) was 0.57. The peak area ratio (SiOx/Si (0)) of the negative electrode active material obtained in Examples 1 to 13 ranged from 0.06 to 0.72.

In the case where the mixtures of Si particles and CuO powder before pulverization in Examples 1 to 6 were measured by XRD, the peaks of CuO were found around 2θ of 35.4° and 38.4°, but the peaks were not found after pulverization. Furthermore, no peak derived from Si oxide was found in the XRD measurement results of the negative electrode active materials obtained in Examples 1 to 6. It is considered therefrom that oxygen atoms are present in the form of an amorphous Si oxide in the negative electrode active material of the invention.

Example 3

A negative electrode active material and a battery using the same were produced and evaluated in the same manner as in Example 1 except that in the production of the negative electrode active material, the amount of Si particles was changed from 1.56 g to 1.824 g, and the amount of the CuO powder was changed from 0.44 g to 0.176 g.

Examples 4 to 6

A negative electrode active material and a battery using the same were produced and evaluated in the same manner as in Example 1 except that in the production of the negative electrode active material, the amount of Si particles was changed from 1.56 g to the amounts shown in Table 1, and the amount of the CuO powder was changed from 0.44 g to the amounts shown in Table 1. The negative electrode active material obtained in Example 5 was analyzed by XPS. The peak area ratio SiOx/Si (0)) obtained from the results of XPS was 0.19.

Example 7

A negative electrode active material and a battery using the same were produced and evaluated in the same manner as in Example 1 except that in the production of the negative electrode active material, 1.56 g of the Si particles and 0.44 g of the CuO powder as the starting materials were changed to 1.71 g of Si particles having an average particle diameter of 5 μm (produced by Kojundo Chemical Lab. Co., Ltd., purity: 99.9%), 0.29 g of Cu powder (produced by Sigma-Aldrich Co., LLC., purity: 99.7% by mass, average particle diameter: 3 μm) and 0.054 g of water.

Examples 8 to 12

Figure 6:
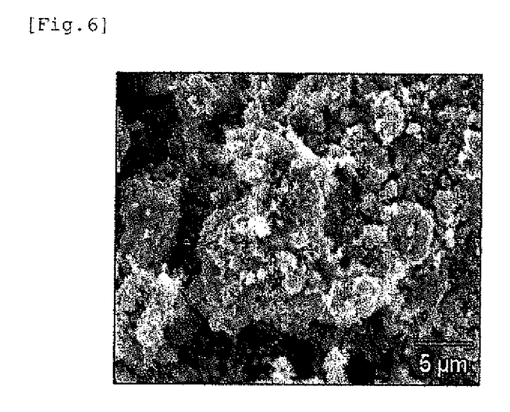
FIG. 6 is the scanning electron micrograph of the negative electrode active material obtained by pulverizing and simultaneously mixing silicon, metallic copper and water.

A negative electrode active material and a battery using the same were produced and evaluated in the same manner as in Example 7 except that in the production of the negative electrode active material, the amount of Cu powder was changed from 1.71 g to the amounts shown in Table 1, and the amount of water was changed from 0.054 g to the amounts shown in Table 1. The scanning electron micrograph of the negative electrode active material obtained in Example 8 is shown in FIG. 6.

Examples 13

A negative electrode active material and a battery using the same were produced and evaluated in the same manner as in Example 1 except that in the production of the negative electrode active material, the pulverization time was changed from 3 hours to 1 hour.

Comparative Example 1

A negative electrode active material and a battery using the same were produced and evaluated in the same manner as in Example 1 except that in the production of the negative electrode active material, the amount of Si particles was changed from 1.56 g to 2 g, and the CuO powder was not used.

Comparative Example 2

A negative electrode active material and a battery using the same were produced and evaluated in the same manner as in Example 1 except that in the production of the negative electrode active material, the amount of Si particles was changed from 1.56 g to 1.628 g, and 0.372 g of metallic copper powder (produced by Sigma-Aldrich Co., LLC., purity: 99.7% by mass, average particle diameter: 3 μm) was used instead of 0.44 g of the CuO powder.

The negative electrode active materials obtained in Examples 5 and 8 were subjected to compositional analysis in the following manner. The contents of Si and Cu were measured in such a manner that a specimen was dissolved in a mixed acid aqueous solution of hydrofluoric acid and nitric acid, and then the contents were measured by an ICP-OES method (ICP optical emission spectrometry). In the measurement of the Cu content, the specimen was dissolved in a mixed acid aqueous solution of hydrofluoric acid and nitric acid, and then such an operation was performed that sulfuric acid was then added thereto, and then the mixture was dried by heating to remove Si in the form of $SiO_2$ by volatilization. The O (oxygen) content was measured by using ONH 836, produced by LECO Corporation. All the negative electrode active materials had a total content (mass) of Si, Cu and O of 98.5% by mass based on the mass of the specimen.

The negative electrode active material of Example 5 was evaluated for the cycle characteristics under the conditions where the cell voltage at the time when the discharge was completed, which was the condition for the evaluation method of the battery capacity and the cycle characteristics, was changed from 3.8 V to 1.6 V for reducing the charge and discharge load (i.e., the conditions where the charge depth was changed from 100% to 60%). As a result, both the capacity maintenance ratios after 50 cycles and after 100 cycles were 99.5% or more, which showed considerably excellent cycle characteristics.

The lithium secondary batteries using the negative electrode active materials obtained by the production method of the invention had a capacity maintenance ratio after 50 cycles of from 58.5% to 102.2%, which showed excellent performance.

The invention claimed is:
1. A method for producing a negative electrode active material, comprising:
   a) physically charging elemental silicon and copper (II) oxide in a pulverization device; and
   b) pulverizing the elemental silicon and copper (II) oxide charged in the pulverization device, wherein the pulverized elemental silicon and copper (II) oxide is also mixed as part of the pulverizing, and
   using the negative electrode active material as a lithium ion secondary battery.
2. A method for producing a negative electrode active material containing fine particles of elemental silicon having an average crystallite diameter ($d_x$) measured by an X-ray diffractometry of 50 nm or less, and having elemental ratios, expressed by molar ratios, Cu/(Si+Cu+O) of from 0.02 to 0.30 and O/(Si+Cu+O) each are from 0.02 to 0.30 comprising:
   a) physically charging elemental silicon and copper (II) oxide in a pulverization device; and
   b) pulverizing the elemental silicon and copper (II) oxide charged in the pulverization device, wherein the pulverized elemental silicon and copper (II) oxide is also mixed as part of the pulverizing, and using the negative electrode active material as a lithium ion secondary battery.

\* \* \* \* \*